Nov. 2, 1943.       D. V. GERKING       2,333,099
SAW CARRIER AND DISPENSER
Filed Oct. 10, 1941
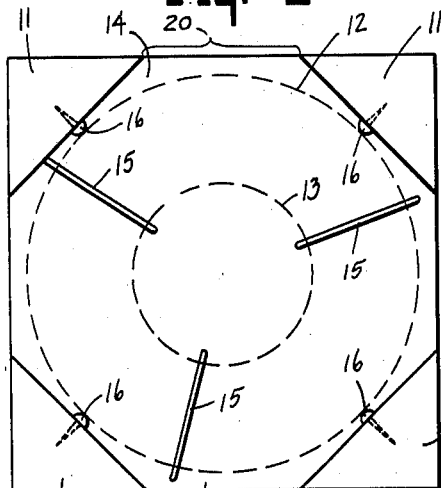
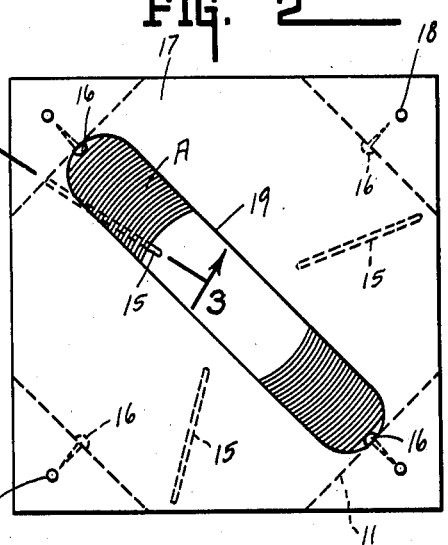
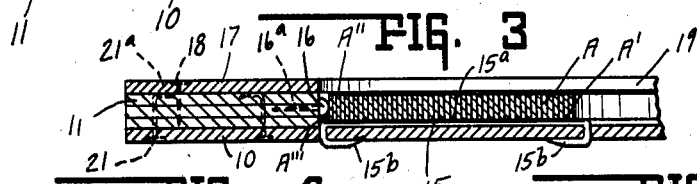
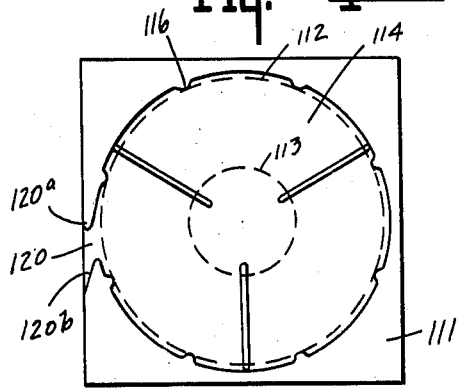
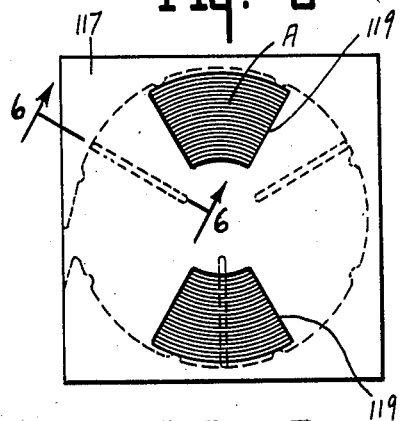
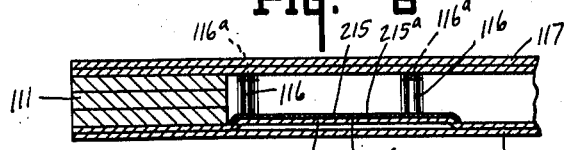
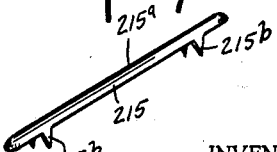
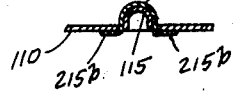
INVENTOR.
DONALD V. GERKING.
BY Lockwood, Goldsmith & Galt
ATTORNEYS.

Patented Nov. 2, 1943

2,333,099

UNITED STATES PATENT OFFICE 2,333,099

SAW CARRIER AND DISPENSER

Donald V. Gerking, Indianapolis, Ind.

Application October 10, 1941, Serial No. 414,541

13 Claims. (Cl. 206—46)

This invention relates to a carrier for an elongated saw of band type or other strip material.

The chief object of this invention is to provide a carrier for a saw of the character mentioned, which carrier when loaded and closed will serve equally as well for transporting purposes and dispensing purposes.

The chief feature of the invention consists in providing a carrier of the aforesaid type with a well arrangement for reception of the saw in scroll formation and, following closure of the well, permits the scroll arranged saw to be transported to its destination and when received at the destination, to be dispensed from the carrier in the desired amount and with comparatively little resistance or interference.

Saws of the general character to be accommodated by carriers of this general type usually range in the width of blade from ⅛" by 1/16" increments up to ⅜" increments and by ⅛" increments from ⅜" up to 1½". The length of such a saw may vary from 100 ft. to 250 ft. more or less as desired.

By way of example, a relatively narrow saw of the first category having a length of about 100 ft. for resale purposes, will weigh from 6 to 8 lbs., whereas a saw, for example, of 1½" in width and 250 ft. in length, commonly called a mill saw, may weigh up to 150 lbs.

It is quite obvious, therefore, that certain materials suitable for packaging a 6 to 8 lbs. load might be unsatisfactory for packaging 100 to 150 lbs. load, and that it would be uneconomical to utilize materials suitable for heavier loads in packages intended to contain the lighter loads.

With this brief explanation of the weight and size of saws, it is to be understood that the carriers illustrated herein and described hereinafter, embody the invention, whereby a single package or carrier may be loaded and when loaded, may be transported and following transportation may be utilized to retain the saw in the package, from which there may be readily dispensed, any desired length of such saw, the remainder of the saw in the package being retained in the desired scroll-like formation for subsequent dispensing.

It is to be understood that the present carrier is devoid of any reel upon which the saw is mounted, the carrier itself being so constructed by means of the invention that a reel is unnecessary since the sole purpose of a reel is to facilitate ease of saw dispensing.

Other objects and features of the invention will be set forth more fully hereinafter.

The full nature of the invention will be understood from the accompanying drawing and the following description and claims:

In the drawing,

Fig. 1 is a top plan view of one form of saw carrier with cover removed and prior to saw application thereto.

Fig. 2 is a similar view of the complete carrier with saw included therein and of the form illustrated in Fig. 1.

Fig. 3 is an enlarged vertical sectional view taken substantially on the line 3—3 of Fig. 2 and in the direction of the arrows.

Fig. 4 is a view similar to Fig. 1 and of a modified form of a saw carrier.

Fig. 5 is a view similar to Fig. 2 and of the modified form of saw carrier illustrated in Fig. 4.

Fig. 6 is an enlarged vertical sectional view taken substantially on the line 6—6 of Fig. 5 and in the direction of the arrows.

Fig. 7 is an enlarged perspective view of one of the elongated, substantially radial, bearing means illustrated in Figs. 4 to 6, inclusive.

Fig. 8 is an enlarged, transverse sectional view of the elongated, substantially radial, bearing means illustrated in Figs. 4 to 6, inclusive.

In the drawing, as previously indicated, Figs. 1 to 3 are illustrative of one embodiment of the invention, and it might be here stated this is the heavy weight type carrier.

Figs. 4 to 6, inclusive, are illustrative of a second embodiment of the invention and representative of the lighter weight type of carrier.

In Fig. 1 of the drawing, the numeral 10 indicates a bottom forming member. This is herein shown as of polygonal outline and more specifically square in outline. At each corner there is provided a triangular spacing block structure indicated generally by the numeral 11, the hypotenuse thereof being parallel to a tangent of the inscribed circle indicated by the numeral 12. This inscribed circle indicates the position of the outer outline of an elongated saw having any desired width and any desired thickness but having a smooth back face and the front or toothed cutting face, the saw being arranged in scroll formation. The dotted line 13 in Fig. 1 indicates a concentric inner circle generally conforming to the inner circular portion of the scroll arranged saw when the carrier is loaded.

Exposed upon the upper face of the well 14 formed by the bottom member 10 and the triangular spacing members 11, are a plurality of elongated, substantially radially directed bearing members 15. These bearing members are arcuately spaced apart and herein three are illustrated, it having been found that three are sufficient. The flat face A' of the scroll arranged saw bears upon the upper and coplanar surfaces 15a of these radial bearing members 15.

Positioned between the top and bottom of each corner positioned spacing means 11 and at that point, which is closest to the adjacent saw defining position 12, there is provided an abutment 16 herein shown in the form of a partial spherical surface and against which the outside face A''' of the outside turn of the scroll arranged saw A bears. This abutment or contact means is of such character that while the side A''' of the saw A engages the same, such means offers no obstruction to the passage of the saw teeth A'' past the same.

Reference will be had a little later to the detailed construction of the carrier so far described and reference now will be had to Fig. 2.

A cover member 17 substantially similar to the bottom member 10 is secured to the spacing means 11 as by the nails 18. This cover is secured after the desired length of scroll wound saw A is placed in the carrier prior to cover mounting. The cover, see Fig. 2, is provided with an elongated opening 19 therethrough. This exposes the saw in the carrier and through this opening 19 the approximate amount of saw remaining in the carrier following each dispensing operation, is observed.

The carrier with the included saw, as illustrated in Fig. 2, and as previously described, is shipped to the point of sale or use and the salesman or millwright may readily rotate the saw by engaging the upper face of the scroll arranged saw A in the carrier until the outer end of the saw projects outwardly through one of the openings, indicated by the numeral 20. That short end exposed may then be pulled upon to effect the discharge of the desired length of saw from the carrier and following accurate measurement of the desired length desired by the purchaser or user, such length is severed from the remainder of the saw and then the short end which has remained exposed is turned into the carrier, if desired, by pushing the exposed end of the saw into the carrier or by reversely rotating the remainder of the saw by engaging with the fingers the saw teeth exposed through the opening 19. The flat face A' of the scroll wound saw A riding the upper face of the elongated radially positioned and arcuately spaced bearing members 15, readily permits of saw free end ejection, saw free end retraction and saw rotation in the carrier, all as described.

The abutments 16 prevent the saw teeth A'' from engaging the sides of the resulting well 14, previously described, and thus permit the free rotation, et cetera.

Reference now will be had more particularly to Fig. 3. For the heavier loads, the top and bottom body members 10 and 17 preferably are formed of ply wood, including three or more plies. Such ply wood formation prevents sagging, warping, and the like, insures substantial parallelism between these two body members.

The corner positioned spacing means herein is illustrated as comprising a plurality of layers of ply wood. As shown in Fig. 3, clout nails 21 are employed to secure these layers together and to the bottom member 10 the ends 21a of said nails being turned angularly as illustrated and driven down and embedded in the upper surface of the uncovered corner positioned spacers. The spherical abutment 16 is illustrated herein as an upholstery tack with the shank portion 16a. Various other forms of abutments may be employed, such as partially embedded balls, and the like.

The elongated substantially radial bearing means 15 has its upper surface 15a engaged by the flat face A' of the spiral or scroll arranged saw A and the upper portion indicated by A'' is the toothed portion of the saw. It will be observed this toothed portion is above the abutment 16 so that the abutment 16 only rides the smooth face A''' of the outer turn of that saw and the teeth A'' thereof do not engage the abutment.

The member 15 is herein shown as of wire form and each end is provided with a pointed extension 15b. These pointed extensions 15b at opposite ends of the member 15 are driven through the body member 10 and then are clinched inwardly toward each other, as illustrated in Fig. 3.

It will be observed, see Fig. 1, having reference to the diagrammatic representations, circles 12 and 13, that the opposite ends of these members 15 are positioned farther apart than the two circles so that every portion of the saw has the back face A' thereof riding these members. The abutments 16 in addition to facilitating rotation of the entire scroll in the carrier by reducing side friction to a minimum, confine the scroll to the area included within the outer circle and hence, no part of the saw when in scroll formation can drop behind and engage the bottom portion 10 of the carrier adjacent the spacing means 11. The saw in scroll form tends to expand, so no part thereof projects within circle 13.

In Figs. 4, 5 and 6, there is illustrated a modified form of the invention and one which is primarily intended for light load purposes, herein the numeral 110 indicates the body, 111 the spacing means and adhesively secured thereto and forming therewith a well portion 114. The spacing means 111 herein are shown substantially continuous and there is provided at one side a throat 120, which throat is curved as at 120a and has one wall 120b slightly inclined to the tangent to a radius to the throat 120.

Upon the inner wall at predetermined arcuate distances, there projects inwardly into the well from the wall the abutments 116. As shown more fully in Fig. 6, these abutments are initially the height of the spacing means 111.

The numeral 112 indicates the exterior and 113 the interior diagrammatic circles designating saw occupied area of the well. It is to be understood in this form of the invention, the carrier is formed of paper board material and hence, the first time a length of saw is fed through the throat 120, the teeth at the upper edge of the saw do reduce the upper portion of the abutments 116, as indicated by the dotted line 116a.

The cover in this form of the invention is indicated by the numeral 117 and is provided with two openings 119 as illustrated in Fig. 5. The saw is indicated by the letter A. The cover may be adhesively applied or otherwise secured to the spacing means 111 after the saw in scroll arrangement is seated in the well 114. The saw is thus retained in the well for transportation purposes.

When it is desired to dispense the saw from the well, fingers of both hands through the openings 119 engage the top of the saw A and rotate the saw counterclockwise so that the free and outer end of the saw will feed outwardly from the throat and tangential of the scroll and bear against the face 120b. When a sufficient amount has been so projected, the free and exposed end of the saw is engaged and the desired amount is pulled from the carrier. Following severance of that amount of saw length, the scroll then is again engaged through openings 119 and reversely rotated, or the free end may be forced into the throat 120, either form of return being possible. In the feeding of the saw for dispensing or for storage other than in the initial application of the saw to the well, the entire scroll is bodily rotated, and this applies to both forms of the invention.

To facilitate scroll rotation in the well, if desired, see Figs. 6 and 8, the bottom 110 may have formed in the upper face thereof, elongated radially directed embossments 115. Whenever the board 110 is of such thickness and the character of paper board stock that it will not readily emboss, then the board 110 is made up of at least two plies, the upper one being of embossable material and having the elongated portions 115 projecting upwardly as shown. Whenever the paper board material is of embossable character, the multi-ply construction so far as the bottom 110 is concerned, need not be employed.

Whenever it is desired not to emboss the bottom board, or to emboss the same and protect the embossment, there may be provided an elongated sheet metal member 215, see Fig. 7, which is substantially arcuate in cross section, see Fig. 8, and which with its side edges is provided with projecting tongues 215b. The portion 215 has the upper bearing edge 215a.

As previously stated, if the board 110 is not embossed, the requisite number of elongated members 215—see Fig. 7—may be applied as shown in Figs. 4 and 5, to the bottom 110 and serve as radial bearing members. In that event the prongs 215b are anchored as shown in Fig. 8 by bending the same laterally of the body portion of the elongated member. In this instance, the prongs are bent outwardly and oppositely as distinguished from the prongs in Fig. 3 being bent inwardly and towards each other.

As shown in Figs. 6 and 8, the member 215 is provided as a cover or protection member for the embossment 115, having the upper face or edge 115a. For small and light weight saws, it is quite evident this metallic reenforcement and surfacing arrangement will not be required. Carriers for medium weight saws and of paper board stock, which normally might be objectionable in that the embossed radial bearing portions might be of insufficient strength, accordingly are provided as illustrated, with the additional cover structure or, if desired, the embossments may be omitted entirely and only the radial bearing members shown in Figs. 7 may be utilized with paper board construction.

It is also to be understood that elongated bearing member shown in Fig. 7 may be, wherever deemed advisable or expedient, substituted for the elongated bearing member shown in Figs. 1 to 3, inclusive.

It also will be understood that the form of the invention shown in Figs. 1 to 3, inclusive, is one that has been found to be most practical, economical and efficient for the packaging, transportation and dispensing of heavy weight saws.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A dispensing carrier for saws and the like, including a pair of spaced substantially parallel body members, means therebetween forming therewith a saw receiving well, said body members being of polygonal outline and said means being positioned at least at the interior corners thereof, and friction reducing means carried by each well exposed face of the corner positioned means and engageable by the outside face of the saw and the outermost turn of the length thereof in scroll form.

2. A dispensing carrier for saws and the like, including a pair of spaced substantially parallel body members, means therebetween forming therewith a saw receiving well, said body members being of polygonal outline and said means being positioned at least at the interior corners thereof, friction reducing means carried by each well exposed face of the corner positioned means and engageable by the outside face of the saw and the outermost turn of the length thereof when in scroll form, and a plurality of substantially radially directed arcuately spaced, elongated bearing means having a bearing face above the bottom surface of the well and upon which the back face of the scroll arranged saw rides to facilitate saw scroll rotation in the well incident to saw dispensing from the carrier.

3. A dispensing carrier for saws and the like, including a pair of spaced substantially parallel body members, means therebetween forming therewith a saw receiving well, a plurality of arcuately spaced friction reducing means carried by the well exposed facing of the intermediate means for engagement by the outside face of the outermost turn of the saw when in scroll form and in the well, a plurality of substantially radially directed arcuately spaced, elongated bearing means having a bearing face above the bottom surface of the well and upon which the back face of the scroll arranged saw rides to facilitate saw scroll rotation in the well incident to saw dispensing from the carrier, each radially directed elongated bearing means including an elongated member upon the face of the body member forming the bottom of the well and having ends directed into said last mentioned body member for anchorage purposes.

4. A dispensing carrier for saws and the like, including a pair of spaced substantially parallel body members, means therebetween forming therewith a saw receiving well, a plurality of arcuately spaced friction reducing means carried by the well exposed facing of the intermediate means for engagement by the outside face of the outermost turn of the saw when in scroll form and in the well, a plurality of substantially radially directed arcuately spaced, elongated bearing means having a bearing face above the bottom surface of the well and upon which the back face of the scroll arranged saw rides to facilitate saw scroll rotation in the well incident to saw dispensing from the carrier, each radially directed elongated bearing means including an embossed portion upon the well surface of the body member forming the bottom of the well.

5. A dispensing carrier for saws and the like, including a pair of spaced substantially parallel body members, means therebetween forming therewith a saw receiving well, a plurality of arcuately spaced friction reducing means carried by the well exposed facing of the intermediate means for engagement by the outside face of the outermost turn of the saw when in scroll form and in the well, a plurality of substantially radially directed arcuately spaced, elongated bearing means havng a bearing face above the bottom surface of the well and upon which the back face of the scroll arranged saw rides to facilitate saw scroll rotation the well incident to saw dispensing from the carrier, each radially directed elongated bearing means including an elongated metal member upon the face of the body member forming the bottom of the well and having penetrating portions extending into the last mentioned body member for metal member anchorage.

6. A dispensing carrier for saws and the like, including a pair of spaced substantially parallel body members, means therebetween forming therewith a saw receiving well, a plurality of arcuately spaced friction reducing means carried by the well exposed facing of the intermediate means for engagement by the outside face of the outermost turn of the saw when in scroll form and in the well, a plurality of substantially radially directed arcuately spaced, elongated bearing means having a bearing face above the bottom surface of the well and upon which the back face of the scroll arranged saw rides to facilitate saw scroll rotation in the well incident to saw dispensing from the carrier, each radially directed elongated bearing means including an elongated arcuately cross sectioned sheet metal member with body member penetrating prongs at the edges of the metal member for anchorage purposes.

7. A dispensing carrier for saws and the like, including a pair of spaced substantially parallel body members, means therebetween forming therewith a saw receiving well, a plurality of arcuately spaced friction reducing means carried by the well exposed facing of the intermediate means for engagement by the outside face of the outermost turn of the saw when in a scroll form and in the well, a plurality of substantially radially directed arcuately spaced, elongated bearing means having a bearing face above the bottom surface of the well and upon which the back face of the scroll arranged saw rides to facilitate saw scroll rotation in the well incident to saw dispensing from the carrier, each radially directed elongated bearing means including an embossed portion upon the well surface of the body member forming the bottom of the well, and an elongated sheet metal member with body member penetrating portions superposed upon the embossed portion of the body member and protecting the upper face thereof.

8. A dispensing carrier for saws and the like, including a pair of spaced substantially parallel body members, means therebetween forming therewith a saw receiving well, said body members being of polygonal outline and said means being positioned at least at the interior corners thereof, and friction reducing means carried by each well exposed face of the corner positioned means and engageable by the outside face of the saw and the outermost turn of the length thereof in scroll form, said wall carried means being integral with the corner means.

9. A dispensing carrier for saws and the like, including a pair of spaced substantially parallel body members, means therebetween forming therewith a saw receiving well, said body members being of polygonal outline and said means being positioned at least at the interior corners thereof, and friction reducing means carried by each well exposed face of the corner positioned means and engageable by the outside face of the saw and the outermost turn of the length thereof in scroll form, each of said wall carried means including a partially spherical head portion and an anchoring portion for securing the head portion to the well defining wall of spacing means, the well innermost portion of the head portion lying below the plane of the saw tooth line for tooth clearance purposes.

10. In a well type dispensing carrier for scroll arranged saw, the combination of a carrier formation having a bottom wall and a side wall forming portion, and means upon the latter and projecting into the well for spacing the teeth of the outermost saw turn from the well wall.

11. In a well type dispensing carrier for scroll arranged saw, the combination of a carrier formation having a bottom wall and a side wall forming portion, means upon the latter and projecting into the well for spacing the teeth of the outermost saw turn from the well wall, and a plurality of means upon the bottom wall of the well, each having upper surfaces which are coplanar, the plane thereof being above the well bottom for saw back face contact to facilitate saw scroll rotation in the well incident to saw dispensing from the carrier.

12. In a well type dispensing carrier for a scroll arranged saw, the combination of a carrier formation having a bottom wall and a side wall forming portion, and means upon the latter and projecting into the well for spacing the teeth of the outermost saw turn from the well wall, the well side wall portion being a substantially continuous inner wall with a dispensing outlet defined by an elongated throat having a face slightly angular to a tangent to the well wall at a radius including the junction of the outlet and well.

13. A carrier as defined by claim 11, characterized by the well side wall portion being a substantially continuous inner wall with a dispensing outlet defined by an elongated throat having a face slightly angular to a tangent to the well wall at a radius including the junction of the outlet and well.

DONALD V. GERKING.